US010076892B2

(12) United States Patent
Song et al.

(10) Patent No.: US 10,076,892 B2
(45) Date of Patent: Sep. 18, 2018

(54) ISOTHERMAL PROCESSED COPPER CLADDED ALUMINUM COMPOSITE

(71) Applicants: Jay Song, Aliso Viejo, CA (US); Haitao Wu, Hangzhou (CN)

(72) Inventors: Jay Song, Aliso Viejo, CA (US); Haitao Wu, Hangzhou (CN)

( * ) Notice: Subject to any disclaimer, the term of this patent is extended or adjusted under 35 U.S.C. 154(b) by 617 days.

(21) Appl. No.: 14/491,983

(22) Filed: Sep. 20, 2014

(65) Prior Publication Data

US 2015/0086807 A1 Mar. 26, 2015

Related U.S. Application Data

(60) Provisional application No. 61/880,856, filed on Sep. 21, 2013.

(51) Int. Cl.
*C21D 8/02* (2006.01)
*B32B 15/01* (2006.01)
*B21C 37/04* (2006.01)
*H01B 1/02* (2006.01)
*B23K 9/167* (2006.01)
(Continued)

(52) U.S. Cl.
CPC .......... *B32B 15/017* (2013.01); *B21C 37/042* (2013.01); *B23K 9/167* (2013.01); *B23K 26/262* (2015.10); *H01B 1/023* (2013.01); *B21B 2001/383* (2013.01); *B21B 2201/12* (2013.01); *B21C 23/005* (2013.01); *B21C 23/22* (2013.01);
(Continued)

(58) Field of Classification Search
None
See application file for complete search history.

(56) References Cited

U.S. PATENT DOCUMENTS 3,648,356 A * 3/1972 Ziemek ............. B23K 20/2333
228/130
3,854,193 A * 12/1974 Yamaguchi ............... B21C 3/14
228/130
(Continued)

FOREIGN PATENT DOCUMENTS

| GB | 1337341 | * | 11/1973 |
| GB | 1376328 | * | 12/1974 |
| WO | WO-2009/033317 A1 | * | 3/2009 |

*Primary Examiner* — George Wyszomierski
(74) *Attorney, Agent, or Firm* — Jenny Lee

(57) ABSTRACT

The present invention provides an isothermal processing method for making an isothermal processed copper clad aluminum composite comprising: providing an aluminum component and a copper component; cleaning the aluminum component and shape finishing the aluminum component; extruding the aluminum component into a core aluminum billet; cleaning the copper component; transforming the copper component into a copper cladding layer; cladding longitudinal and circumferential surfaces of the core aluminum billet with the copper cladding layer and molding the core aluminum billet and the copper cladding layer together to form a copper cladded aluminum billet; and transforming the copper cladded aluminum billet into an isothermal processed copper cladded aluminum composite through isothermal rolling and annealing. The present invention also provides an isothermal processed copper cladded aluminum composite and a system for manufacturing an isothermal processed copper cladded aluminum composite.

10 Claims, 8 Drawing Sheets

(51) Int. Cl.
*B23K 26/262* (2014.01)
*B21C 43/00* (2006.01)
*B21C 23/00* (2006.01)
*B21C 23/22* (2006.01)
*B21B 1/38* (2006.01)
*B23K 101/38* (2006.01)

(52) U.S. Cl.
CPC .......... *B21C 43/00* (2013.01); *B23K 2201/38* (2013.01); *Y10T 428/1275* (2015.01)

(56) References Cited

U.S. PATENT DOCUMENTS

| | | | | |
|---|---|---|---|---|
| 4,479,833 A * | 10/1984 | Gessinger | ................ | C21D 7/13 |
| | | | | 148/514 |
| 2006/0289448 A1* | 12/2006 | Natsuhara | .............. | H05B 3/143 |
| | | | | 219/444.1 |
| 2013/0220993 A1* | 8/2013 | Uno | ...................... | F16L 53/008 |
| | | | | 219/535 |

* cited by examiner

US 10,076,892 B2

ISOTHERMAL PROCESSED COPPER CLADDED ALUMINUM COMPOSITE

CLAIM OF BENEFIT OF FILING DATE

This application claims the benefit of the filing date of U.S. Provisional Application Ser. No. 61/880,856 titled "Mechanism of Short Flow Process for Continuous Fabricating Copper Cladding Aluminum Alloy Composite" filed on Sep. 21, 2013, which is incorporated herein by reference for all purposes.

FIELD OF INVENTION

The present invention relates to new and useful improvements in copper cladded aluminum composites generally used for electrical transmission and other electrical applications. More particularly, the present invention relates to copper clad aluminum composites produced by isothermal processing technology.

BACKGROUND OF THE INVENTION

Copper possesses properties of excellent electrical and thermal conductivity and strong corrosion resistance; and is considered as electrical and thermal conductor of choice. Unfortunately, its supply on earth is relatively limited. In contrast, the supply of aluminum on earth is substantial greater as it is only preceded by oxygen and silicon. Aluminum possesses properties of small specific density, good electrical and thermal conductivity and mechanical ductility. Copper cladded aluminum composite ("CCAC") possesses physical, chemical and mechanical properties of both copper and aluminum. CCAC is characterized by good electric and thermal conductivity, good corrosion resistance. It is lightweight and more affordable than copper.

Rapid development of networking technology, information technology, mobile and wireless communication, material science and technology, aeronautics and aerospace introduces great opportunities for application and development of metallic composites. CCAC has been used as a substitute for copper in the field of electrical and thermal conductivity. CCAC is also widely used in electronics, electrical power, metallurgy, machinery, energy, automobile, defense, aeronautics, aerospace and various industrial applications.

Nevertheless, its applications have been limited by its quality. Copper and aluminum can be easily oxidized. They have very different yield strength, density, coefficient of heat expansion. These differences have limited the quality of conventionally produced CCAC. Current CCAC products are produced by various conventional methods such as explosive binding, weld binding, roll binding, drawing binding, liquid-solid phase binding, liquid-liquid phase binding, etc. These methods, even under extreme processing conditions (such as large deformation rate of rolling, annealing at high temperature, or the like), do not produce a high quality CCAC that can act as a full and complete substitute for copper in its various electrical applications. These current CCAC products generally have restrictions as to their low binding strength due to less bimetallic diffusion; small depth of transitional binding; and poor physical uniformity and consistency of materials. Furthermore, these conventional methods provide low yield rate of production and are not capable of being a continuous manufacturing process.

If CCAC is to be used for electric power transmission and certain electrical applications, strong bimetallic interfacial bonding strength and copper layer uniformity and consistence are desired. It is also desired that such CCAC provides thermal stability, carries electrical current evenly, maintains long servicing life, and can be subjected to machining processing (such as punching, shearing, bending, distorting or the like) without affecting the quality and/or performance of CCAC.

SUMMARY OF THE INVENTION

The present invention provides an isothermal processing method for making an isothermal processed copper cladded aluminum composite comprising: providing an aluminum component and a copper component; cleaning the aluminum component and shape finishing the aluminum component; extruding the aluminum component into a core aluminum billet; cleaning the copper component; transforming the copper component into a copper cladding layer; cladding longitudinal and circumferential surfaces of the core aluminum billet with the copper cladding layer and molding the core aluminum billet and the copper cladding layer together to form a copper cladded aluminum billet; and transforming the copper cladded aluminum billet into an isothermal processed copper cladded aluminum composite through isothermal rolling and annealing.

The present invention also provides an isothermal processed copper cladded aluminum composite comprising: an aluminum core and a copper cladding wherein the copper cladding uniformly and circumferentially covers the longitudinal surfaces of the aluminum core; boundary between the copper cladding and the aluminum core is metallurgically bonded through an isothermal process; and the copper cladding has copper layer uniformity. The isothermal processed copper cladded aluminum composite has the following desirable qualities including but not limited to lightweight (it has less weight than solid copper), low transitional electrical and thermal resistance at the transitional boundary between the aluminum core and the copper cladding, strong bonding strength, good uniformity and consistency, and good mechanical processing properties of ductility and formability, when performing normal punching, shearing, bending, distorting process, the aluminum core and the copper cladding will not be separated. These qualities make it suitable for use in electric power transmission and most, if not all, electrical applications. It can serves as a lighter weight substitute for copper in electrical applications.

The present invention further provides a system for on-line continuous manufacturing of an isothermal processed copper cladded aluminum composite comprising: a pretreatment unit for cleaning an aluminum component and an copper component and for shape finishing the aluminum component; an extrusion unit for extruding the aluminum component into a core aluminum billet; a billet preparation assembly for transforming the copper component and the core aluminum billet into a copper cladded aluminum billet; and an isothermal assembly for transforming the copper cladded aluminum billet into an isothermal processed copper cladded aluminum composite.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE INVENTION

Figure 1:
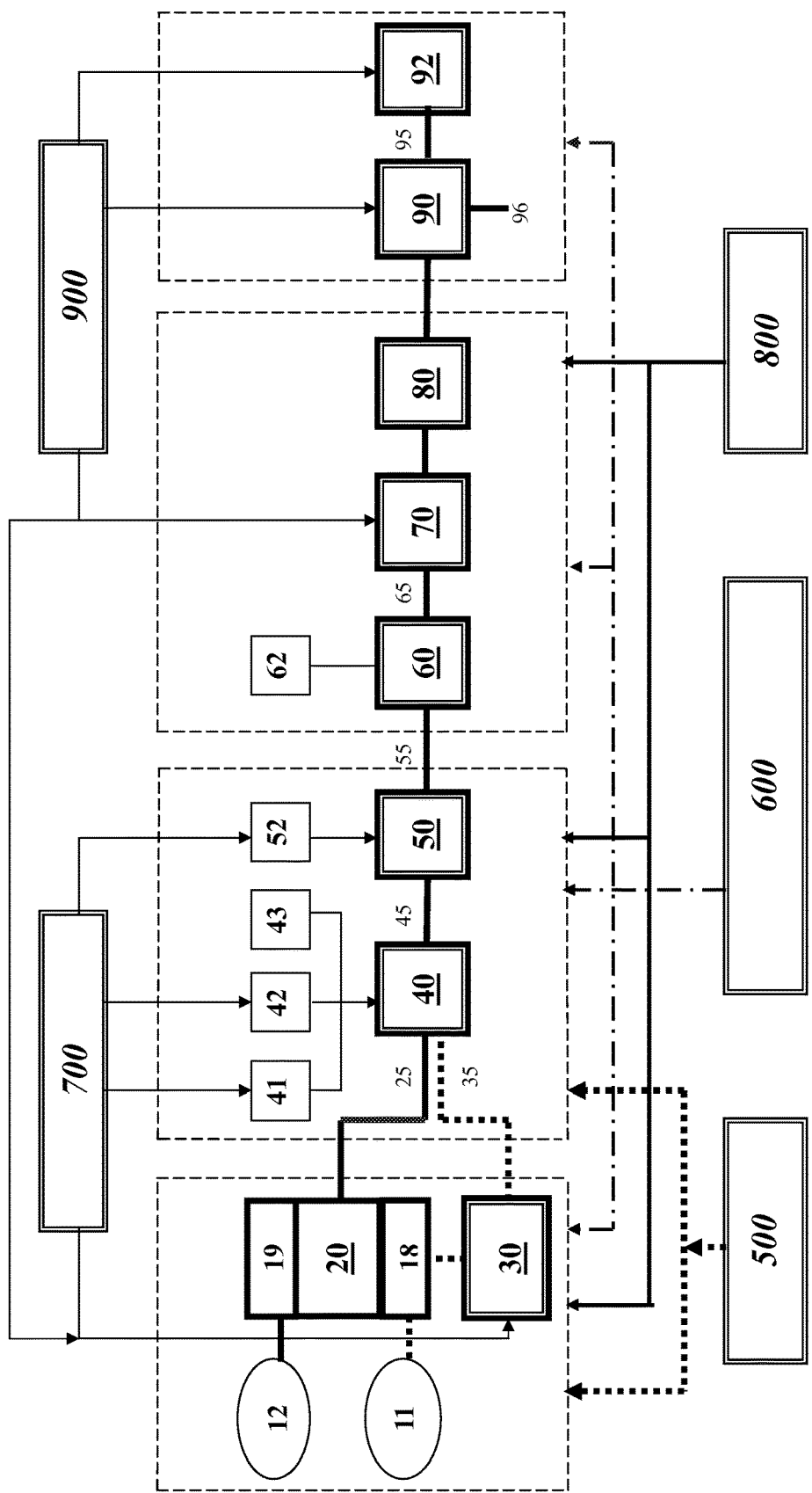
FIG. 1 is a flowchart of an isothermal processing method for making an isothermal processed copper clad aluminum composite in accordance to a method of the present invention.
Figure 9:
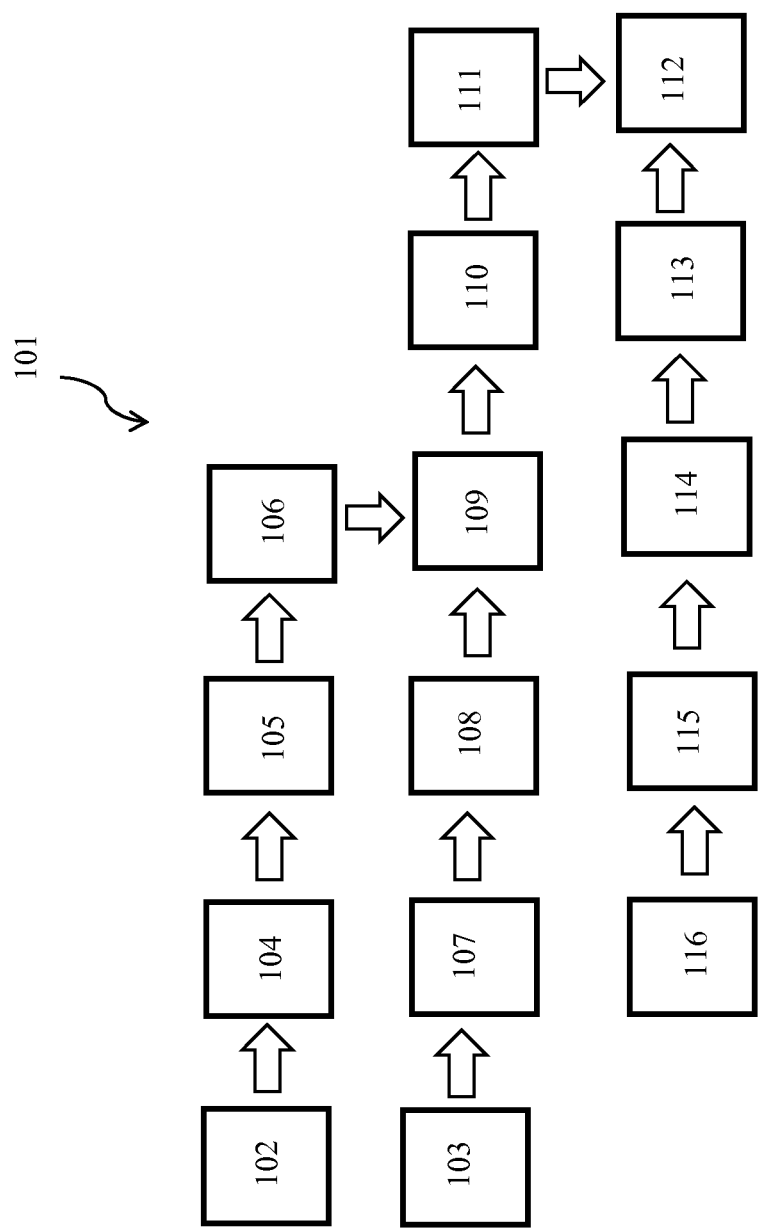
FIG. 9 is another flowchart of an isothermal processing method for making an isothermal processed copper clad aluminum composite of the present invention.

Referring to FIGS. 1 and 9, the present invention provides an isothermal processing method 101 for making an isothermal processed copper cladded aluminum composite 55 comprising of providing an aluminum component 11 (102) and a copper component 12 (103). These components (11, 12) are the basic raw materials that form the isothermal processed copper cladded aluminum composite 55 of the present invention and they can be in any suitable shapes. For example, the aluminum component 11 can be a raw aluminum rod (11) and the copper component 12 such as a thin copper strip (12).

The aluminum component 11 is initially feed into an aluminum pretreatment sub-unit 18 of an online raw material pretreatment unit 20 for surface cleaning. The copper component 12 is initially feed into a copper pretreatment sub-unit 19 of the online raw material pretreatment unit 20 for surface cleaning. In one embodiment and referring to FIG. 2, the copper pretreatment sub-unit 19 includes the copper stocker sub-unit 14. The copper stocker 14 assists in the continuous feeding of the copper component 12 and part of the on-line continuous process for the production of the isothermal processed copper clad aluminum composite 55. The copper stocker is used as buffer for storage of the copper component 12 allowing a continuous supply of the copper component for processing.

Referring to FIG. 9, the method 101 further comprises of cleaning the aluminum component 11 (104) and shape finishing the aluminum component 11 (105). These steps (104, 105) provide the necessary surface treatment of the aluminum component 11 for further processing. Conventional methods of surface treatment of aluminum rod include chemical method, grinding method, and peeling method. The chemical method uses alkali and acid to remove stains and oxides on the surface of the aluminum rod. It is then rinses out lye and acid and dries out the aluminum. The disadvantage of the chemical method is due to longer processing flow which easily causes secondary oxidation due to aluminum surface exposes to air and may raise an environmental issue. The grinding method uses grinding brush to repeat burnishing the aluminum rod in order to remove stains and oxides from its surface. The disadvantage of the grinding method is that the heat generated by friction induces secondary oxidation on the aluminum surface. The peeling method places several peeling cutter sets along the advancing direction ("axial") of the aluminum rod. The peeling cutters of each set are uniformly distributed on the plane that is perpendicular to the axial of the aluminum rod and they tilt with the aluminum rod. The surface of the aluminum rod is fully treated when all of the peeling cutter sets are used. The disadvantage of the peeling method is low precision and poor uniformity. The above-mentioned methods are not capable for online surface processing nor can they satisfy the processing requirement of providing uniformity and consistent treatment of the aluminum rod by a highly precision and continuous production line.

Figure 3:
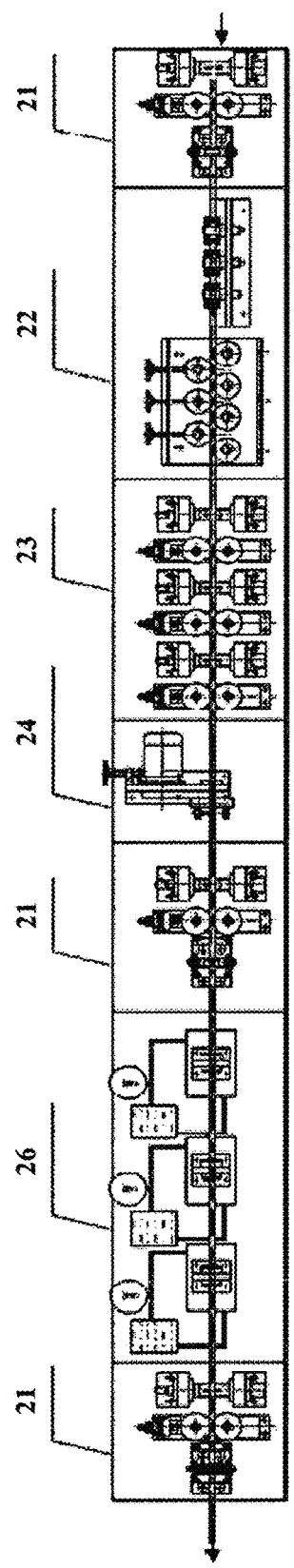
FIG. 3 is a schematic diagram illustrating the top view of a pretreatment unit in accordance to a system of the present invention.

To meet these needs and avoid the disadvantages of the above-mentioned methods, one embodiment of the method 101 uses the following process to accomplish the cleaning and shape finishing steps (104, 105) for the aluminum component 11. Referring to FIG. 3, the aluminum cleaning and shape finishing steps (104, 105) involves processing within the aluminum pretreatment sub-unit 18 of the pretreatment unit 20. The aluminum pretreatment unit 18 is comprised of the following sub-units: an (initial) orientation guide sub-unit 21, an online straighten sub-unit 22, an online rounding sub-unit 23, a pretreatment scraping sub-unit 24, another (intermediate) orientation guide sub-unit 21, a secondary oxidation prevention and precise scraping sub-unit 26, and an additional (exit) orientation guide sub-unit 21. The aluminum component 11 is placed under the traction of continuous production system or independent dynamic power to synchronize linkage with the production system so that it (11) first goes through the initial orientation guide sub-unit 21 to achieve desired or predetermined orientation. The aluminum component 11 is then processed by (i) the online straight sub-unit 22 for straightening (using for precise scraping), (ii) the online rounding sub-unit 23 for rounding (also using for precise scraping), (iii) the pretreatment scraping sub-unit 24 by carve a rifle line onto the surface of aluminum rod, (iv) the (intermediate) orientation guide sub-unit 21 for further orientation, (v) a secondary oxidation prevention and precise scraping sub-unit 26 for oxidation prevention and precise scraping (when the secondary oxidation prevention and precise scraping sub-unit 26 scrapes the aluminum component 11, as part of the scraping pretreatment, the aluminum scrapes will automatically broke into small pieces and fall into collection tank in order to avoid long scrapes causing collection trouble and block operation), and (vi) the (exit) orientation guide sub-unit 21 for final orientation. The described process herein enables online high precision shape finishing and surface cleaning of the aluminum component 11. The processed aluminum component 11 is subject to online straighten and rounding, achieving the required straightness and roundness for precise surface scraping. By completing all of the above-described processes for the cleaning and shape finishing steps (104, 105), the aluminum component now has a fresh and clean surface that satisfies the surface cleanliness and uniformity required by the subsequent steps of the method 101. The cleaning and shape finishing steps (104, 105) possess character of short-flow, high precision scraping and low wastage. The uniformity of the aluminum component 11 reaches ±0.01 mm after the completion of these steps (104, 105).

Figure 4:
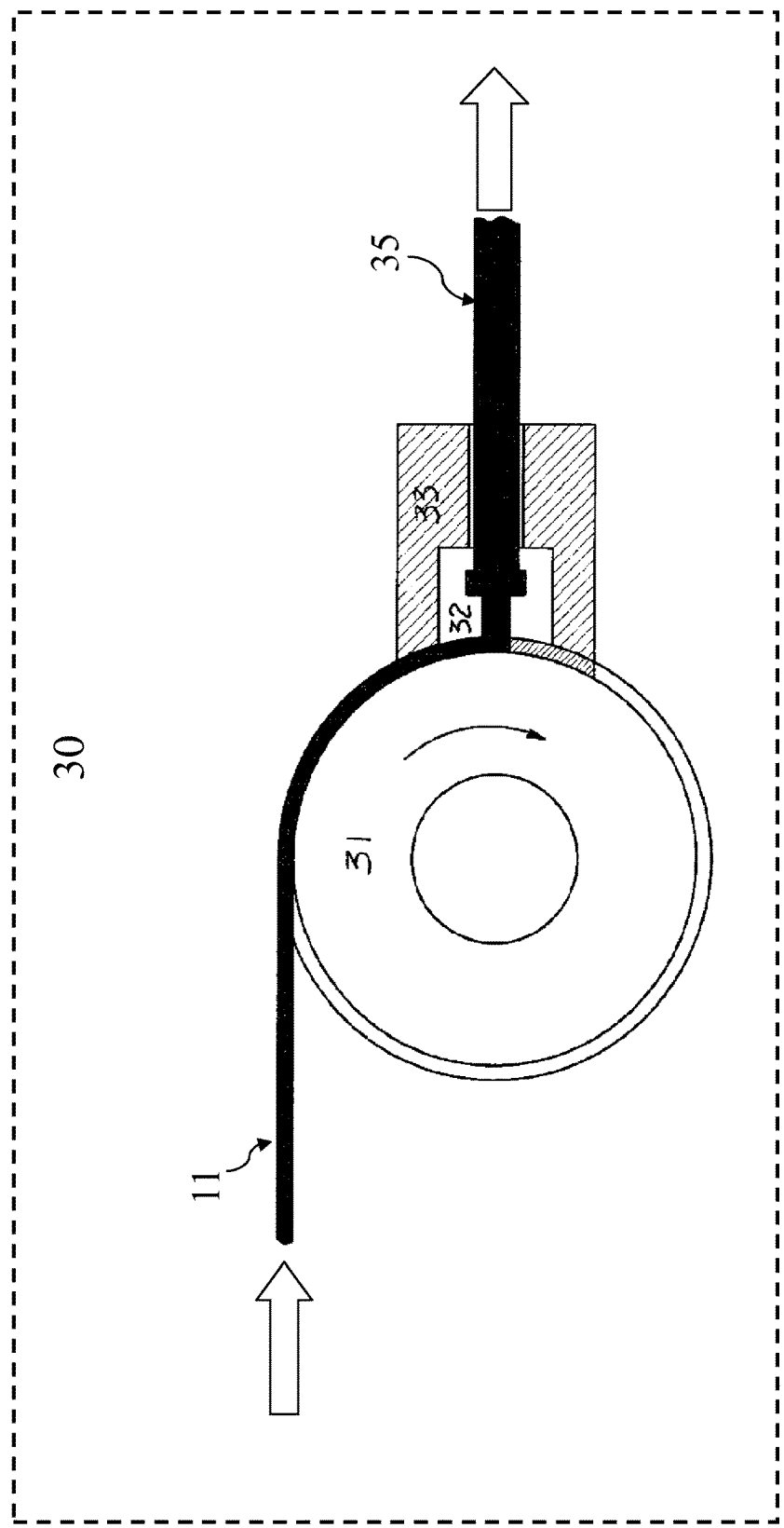
FIG. 4 is a schematic diagram illustrating the continuous extrusion process using the extruding unit in accordance to a system of the present invention.
Figure 6:
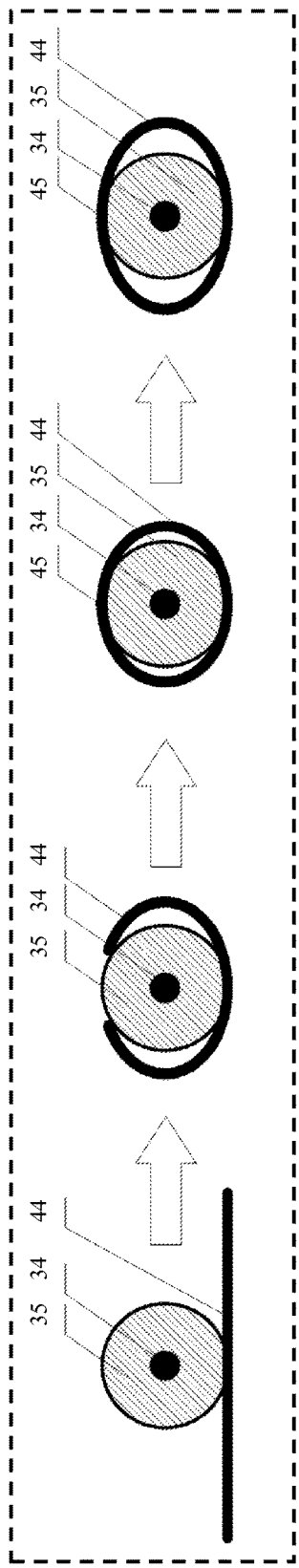
FIG. 6 is a flowchart of the transformation of a copper component and a core aluminum billet into a copper cladded aluminum billet in accordance to the isothermal processing method of FIG. 1.
Figure 7:
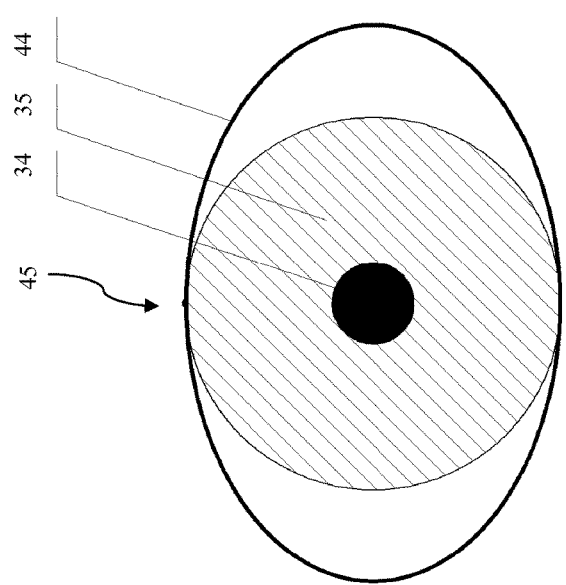
FIG. 7 is a cross-sectional view of an isothermal processed copper cladded aluminum billet in accordance to the present invention.

Referring to FIGS. 1 4, and 9, the next step (106) in the method 101 is extruding the aluminum component 11 into a core aluminum billet 35 by processing the aluminum component 11 through the extrusion unit 30. Referring to FIGS. 6 and 7, in one embodiment, the step 106 is performed in a fashion that provides the core aluminum billet 35 with an optional lumen 34. In one embodiment of the present invention, the extrusion unit 30 is online and part of the continuous process for the production of the isothermal processed copper cladded aluminum composite 55.

Referring to FIG. 4, the fundamental principle of metal extrusion is the heated die chamber 33 incorporates an abutment that protrudes into the wheel groove, the motor drives the wheel 31 rotation, the high pressure generated by hydraulic station 36 acts on the die chamber wall, the force applied by the rotating wheel causes the feeding aluminum-rod 11 near the abutment of which heated and softened by the friction and environment to flow plastically into the die chamber and extrude through the die 32, under the high temperature generated by frictional and environment, the aluminum component 11 goes through recrystallization and deformation to extrude the core aluminum billet 35. It is preferred that the extrusion unit 30 has uniform speed, flawless surface, operation stability, and its die chamber 33 has a constant temperature. In one embodiment, the die chamber temperature is in the range from about 350° C. to about 500° C.; the speed of extrusion wheel is ranged from about 5 rpm/min to about 32 rpm/min. It is preferred that the core aluminum billet 35 possess one or more of the following qualities: straightness, uniformity, generally flawlessness on its surface, its cross-sectional shape and position tolerance is ≤±0.5%. As noted above, the core aluminum billet 35 may also optionally include the lumen 34. Due to the temperature and extrusion condition, the core aluminum billet 35 achieves recrystallization, the lattice tissue is improved. It is preferred that the extruding step 106 operates under an inert-gas atmosphere in order to prevent the formation of surface oxidation.

It should be noted that the term "about" used herein the application shall mean ±0.5% of the associated value.

Referring to FIG. 9, the method 101 also includes cleaning the copper component 12 (107) and then transforming the copper component 12 into a copper cladding layer 45 (108). The copper cleaning sub-unit 19 of the surface cleaning unit 20 includes an array of soft grinding brushes that clean and polish surface of the copper component 12 (e.g., in back and forth motions in order to remove contaminates from the surface). Thereafter, the copper component 12 undergoes further treatment removing additional contaminates such as oxides, etchings and other compounds before being subjected to blow drying in order to prevent re-contamination.

Once the copper component is treated by this cleaning process, it becomes a cleaned copper component 25 that enters into an inert gas atmosphere of a billet preparation assembly 40 wherein the transformation step 108 takes place. The inert gas atmosphere or environment prevents formation of new oxide layer on the cleaned copper component 25. The transformation of the deformed and cleaned copper component 25 into the copper cladding layer 44 (108) takes place in a billet preparation assembly 40 comprising of the following sub-units: the cladding billet preparation sub-unit 41, the high-frequency argon arc welding or laser welding sub-unit 42, and the molding sub-unit 43. In one embodiment, this step (108) takes place in an inert-gas atmosphere.

The mechanism for forming the copper cladding layer 44 can be generally described as follows. The contacting surface friction generated by actions between the cleaned copper component 25 and the molds in cladding billet preparation sub-unit 41 changes the stress distribution of the cleaned copper component 25 with the magnitude of the friction is proportional to the load. When the cleaned copper component 25 undergoes deformation induced by the molds, the contacting surface fraction increases along with external force and results in a large amount of deformation heat and friction heat resulting in an elevated temperature environment and a change from elastic deformation to plastic deformation. This process deforms the cleaned copper component 25 into the copper cladding layer 44. In one embodiment, the copper cladding layer 44 is shaped in a tube-line fashion).

Referring to FIG. 9, the method 101 further includes the step of cladding longitudinal and circumferential surface the core aluminum billet 35 with the copper cladding layer 44 and molding the core aluminum billet 35 and the copper cladding layer 44 together to form a copper cladded aluminum billet 45 (109). Referring to FIG. 1, this step (109) is processed by the billet preparation assembly 40. The cleaned copper component 25 and the extruded core aluminum billet 35 simultaneously enter into the billet preparation assembly 40. As discussed above, the cleaned copper component 25 continuously passes through the sub-unit 41 by pairs of vertical and horizontal molds and gradually forms into the copper cladding layer 44.

Referring to FIG. 6, by continuously passes through the welding sub-unit 42, the copper cladding layer 44 is then used to cover around the entire circumference of the core aluminum billet 35 along its longitudinal direction forming the copper cladded aluminum billet 45. By utilizing double non-consumable electrode argon arc or laser welding torch located within the welding sub-unit 42, a quick and uniform welding of the copper cladding layer 44 ensures the longitudinal welds of the copper cladding layer 44 are smooth, free of radial displacement, and defects-free. The welding torch of the welding sub-unit 42 can be moved axially along the work-piece, it is designed to resolve the impact of velocity gradient onto the welding due to the fabricating process start-up or shutdown. During the welding process and under the protection of inert-argon gas, the argon-arc torch automatically adjusts the welding voltage and current according to thickness of the copper cladding layer 44 and operation speed, the molten pool is introduced due to the welding voltage and current, the formed molten pool meets with the heat balancing principle, argon is injected corresponding to the designed pressure and flow to constraint the arc radiation and slow down the arc erosion onto the seam wall, thus to control the pool diameter, depth, flatness and eliminate weld defects such as air porosity, slag and undercut. The width to thickness ratio of the weld is 2.5:1, flatness <0.1 mm. The welding sub-unit 42 can include any suitable welding torch such as a high-frequency argon arc-welding device, a laser welding device, or the like.

Once the welding process is completed, the copper cladded aluminum billet 45 is further processed by the molding sub-unit 43. Referring to FIGS. 6 and 7, in the molding sub-unit 43, the copper cladded aluminum billet 45 then passes several vertical and horizontal molds so as the copper cladding layer 44 and the core aluminum billet 35 are molded closer to each other. Referring to FIG. 7, the copper cladded aluminum billet 45 is characterized by (i) the copper cladding layer 44 and the core aluminum billet 35 having concentricity, and (ii) the copper cladding layer 44 clads the core aluminum billet 35 in a circumferential and longitudinal direction. In one embodiment, the cladding and molding step (109) is done in the inert-gas atmosphere.

Referring to FIG. 9, after the formation of the copper cladded aluminum billet 45, the method 101 further includes the step (109) of transforming the copper cladded aluminum billet 45 into an isothermal processed copper cladded aluminum composite ("IPCCAC") 55 through using isothermal rolling and annealing. This isothermal processing step (110) involves using the isothermal unit 50 and the annealing unit 52 to transform the copper cladded aluminum billet 45 into the IPCCAC 55.

Due to considerable copper and aluminums differences in atomic mass and density, bonding the two components (the copper cladding layer 44 and the core aluminum billet 35) of the copper cladded aluminum billet 45 together to form the IPCCAC 55 through (solid-phase) isothermal rolling is complex. This isothermal rolling process generally requires the copper cladded aluminum billet 45 and all parts of the isothermal unit 50 and the annealing unit 52 that have physical contacts with the copper cladded aluminum billet 45 to experience the same designated or predetermined processing temperature range. For example and referring to FIG. 5, during the isothermal processing step 110 and within the isothermal rolling unit 50, its lower roller 57 and upper roller 58 have generally the same temperature range as the copper cladded aluminum billet 45. Otherwise, the parts and the billet 45 are likely to absorb heat from one and other decreasing the quality of the IPCCAC 55. The physical and performance uniformity and consistency of the IPCCAC 55 is in part dependent upon maintaining the predetermined temperature range during the isothermal rolling process. Furthermore, the isothermal rolling process is dependent upon many factors such as processing and system conditions (rolling parameter, surrounding environment, condition of billet 45, or the like) and the specific characteristics of the materials to be bonded. Furthermore, the optional lumen 34 assists in the isothermal rolling process of the copper cladded aluminum billet 45 and thereby increases the quality of the IPCCAC 55.

In one embodiment, the isothermal rolling vertical deformation rate of the copper cladded aluminum billet 45 is set from about 25% to about 50%, the isothermal rolling horizontal broadening deformation rate is set from about 5% to about 30% (referring to cross-section perimeter), the isothermal rolling temperature is set from about 150° C. to about 400° C. Furthermore and referring to FIG. 5, in an effort to simplify the analysis of the isothermal rolling process, the following is presumed in the embodiment: (i) the stress F at the contacting point 8 is decomposed into the pressing force F1 and the advancing force F2; (ii) the compression deformation is induced by rolling reduction press F1; (iii) the expansion deformation (parallel to the rollers' (57, 58) axial direction) is induced by rubbed tension f; (iv) the copper cladded aluminum billet 45 is a rigid plastically deformed material that obeys the Von Mises Yield Criterion; (v) the rolling force per unit area is evenly distributed through the upper roller 58 and the lower roller 57; and (vi) between the copper cladded aluminum billet 45 and the upper and lower rollers (57, 58) is sliding friction; (vii) the upper roller 58 has an upper roller radius 52 and an upper roller rolling speed 54 while the lower roller 57 has a lower roller radius 51 and a lower roller rolling speed 53.

Figure 5:
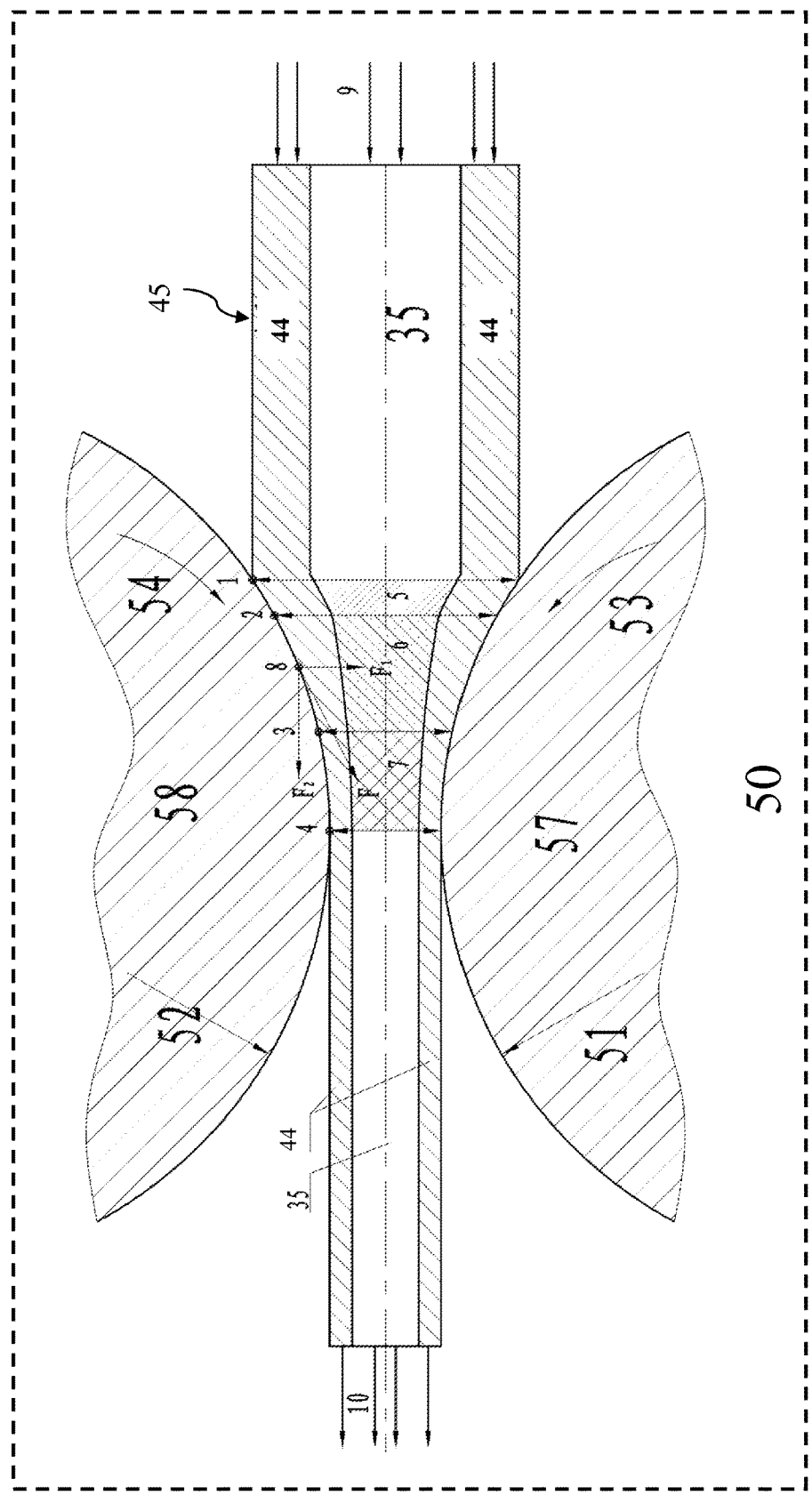
FIG. 5 is a schematic diagram illustrating the different deformation zones of the isothermal-rolling process of a copper cladded aluminum billet in accordance to the isothermal processing method of FIG. 1.

Referring to FIG. 5, the step (109) begins with moving the copper cladded aluminum billet 45 in an orderly fashion into the isothermal rolling unit 50. Once the copper cladded aluminum billet 45 has entered the isothermal rolling unit 50 under an entering speed 9, it (45) is processing by the following zones: (i) aluminum core deformation zone 5 (starting at contact point 1), common deformation zone 6 (starting at the contact point 2), transitional deformation zone 7 (starting at the contact point 3), and ending the rolling at the contact point 4 and the copper cladded aluminum billet 45 exits the isothermal rolling process at a predetermined speed 10. Deformation of the copper cladded aluminum billet 45 is divided into the above-described three zones (5, 6, 7).

Figure 8:
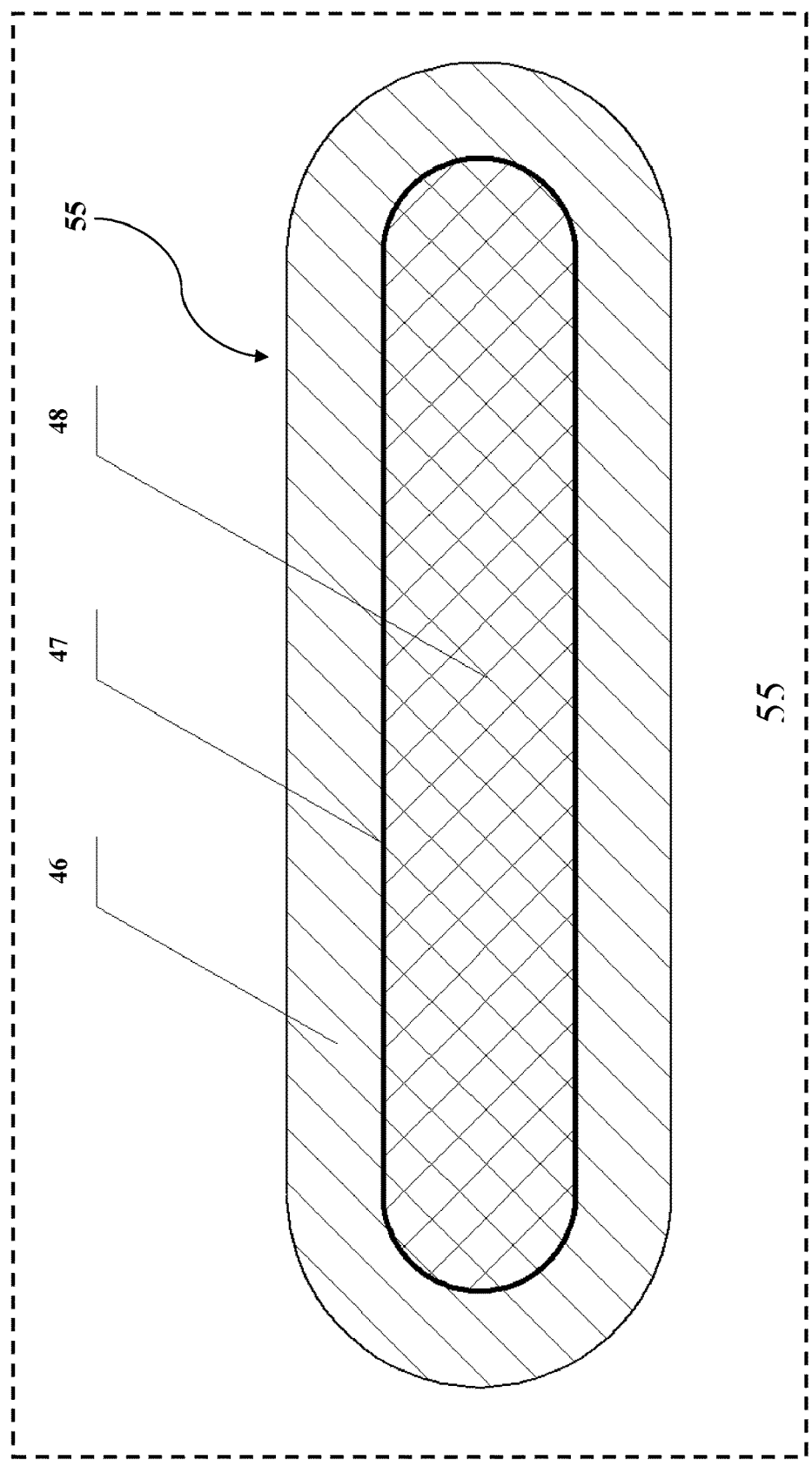
FIG. 8 is a cross-sectional view of one embodiment of an isothermal processed copper cladded aluminum composite in accordance to the present invention.

In the aluminum core deformation zone 5, only the core aluminum billet 35 experiences deformation by the isothermal rolling process due to the amount of reduction and the fact that aluminum is softer than copper so it is easier to be deformed. Referring to FIG. 8, the boundary 47 between the core aluminum billet 35 and the copper cladding layer 44 bears shear force and they (35, 44) are contacted by mechanical occlusion.

In the common deformation zone 6, even the "harder" copper of the copper cladding layer 44 has reached its yield limit so both the copper cladding layer 44 and the core aluminum billet 35 now experience deformation by the isothermal rolling process. In the vertical direction, the copper cladding layer 44 and the core aluminum billet 35 bear press down deformation. In the horizontal direction (parallel to the roller axial), the copper cladded aluminum billet 45 is rolled under the horizontal shear friction force for substantial broadening due to the fact that flow is not limited by the external world. The copper cladding layer 44 and the core aluminum billet 35 slide relatively to each other followed the shear friction rub role. The isothermal rolling process causes the lattice of copper and aluminum at the boundary to experience distortion, bond breaking, and induction of lattice defects. During the annealing process, the interfacial atomic inter-transition and migration to occur at boundary 47 between the copper cladding layer 44 and the core aluminum billet 35 causing a copper-aluminum bonding structure to be formed at the boundary 47.

In the transitional deformation zone 7, there is limited perimeter expansion so under massive pressure, the boundary 47's copper and aluminum lattice structure overly distorting and breaking bond, which promotes constant refinement the crystalline grain in this interfacial transition region, introducing more and more microcrystalline and polycrystalline solid solutions and forming a large number of crystalline grain and sub-crystalline grain boundaries which induces a copper-aluminum interfacial atomic migration and provides atomic diffusion channels. During the isothermal rolling process, the plastic deformation generates thermo deformation, yields interfacial copper-aluminum migration and inter-transition, the thermal motion copper and aluminum atoms fill in vacancies of the crystalline grain boundaries to form a large number of binding and realize copper-aluminum interfacial thermo deformation at the boundary 47.

Referring to FIGS. 1 and 9, after the isothermal rolling process, the isothermal processed copper cladded aluminum billet 45 leaves the isothermal rolling unit 50, enters the annealing unit 52 and undergoes a fast online annealing that is part of the step 109. The temperature of the copper cladded aluminum billet 45 when it 45 comes out of the isothermal rolling process assist in achieving online annealing of the copper cladded aluminum billet 45. In the thermo field, copper and aluminum interfacial atoms diffusion to fill in the vacancies of lattice defects at the boundary of crystalline grain, which result in the dense point binding transforming to surface binding due by atomic thermo motion.

Lattice distortions and defects are quickly repaired and solidified. Interfacial lattice reordered, the microcrystalline solid solution transforms to polycrystalline solid solution, a large degree of re-crystallization occurs, the residual stress reliefs and plastic deformation recovers. Intense atomic thermo motion leads the crystalline transition from non-steady physical binding to steady chemical binding which realizes copper-aluminum interfacial thermo diffusion binding at the boundary 47 to form the IPCCAC (isothermal processed copper cladded aluminum composite) 55 as shown in FIG. 8. The IPCCAC 55 is comprised of a copper cladding 46, an aluminum core 48 and the boundary 47 described above. The IPCCAC 55 is capable or can carry electrical current evenly across the copper cladding 46 for any desired electrical application that may use solid copper to carry electrical current. The reason that the IPCCAC 55 can act as a substitute for solid copper for electrical applications is because the copper cladding 46 has achieve "copper layer uniformity". "Copper layer uniformity" is defined for the purpose of this specification as having a copper layer (cladding) wherein the variance of thickness or depth across the entire copper layer is no more than 8%. Furthermore, the boundary 47 between the copper cladding 46 and the aluminum core 48 is metallurgically bonded by the method 101. This metallurgically bond is extremely robust and "stronger than aluminum intrinsic bonding". For the purpose of this specification, the term "stronger than aluminum intrinsic bonding" shall mean that its shear strength is greater than the intrinsic shear (or anti-shear) strength of aluminum. In another words, the metallurgical bond located at the boundary 47 discussed above has a shear strength that is greater than the intrinsic shear (or anti-shear) strength of aluminum. Basically, aluminum will shear before any occurrence of shearing (or breakage) at the metallurgically bonded boundary 47.

The IPCCAC 55 also has the following desirable qualities including but not limited to being lighter weight than solid copper, low transitional electrical and thermal resistance at the boundary 47, strong bonding strength, good uniformity and consistency, and good mechanical processing properties of ductility and formability. All of the above-mentioned qualities will likely make the IPCCAC 55 suitable for use in electric power transmission and most, if not all, electrical applications. Furthermore, the IPCCAC 55 can serves as a lightweight substitute for copper in electrical applications. For example, subject to additional known manufacturing processes, the IPCCAC 55 can be manufactured into various products such as CCAC bus bars, wires, tubes and other CCAC products. An example of an IPCCAC bus bar is shown in Exhibit 8. However, it should be noted that the present invention is intended to cover any and all IPCCAC products regardless of their size, shape, dimensions, profiles, etc. Those skilled in the art may add processing steps as may be best suited to the requirements of a particular use or product and still be within the scope of the present invention.

In one embodiment of the present invention, the copper component 12 is comprised of oxide-free copper strips (industrial T2, 99.99% purity); the aluminum component 11 is comprised of clean aluminum rods (industrial L3M, 99.50% purity). The copper and aluminum boundary 17 is anhydrous, grease-free and oxide-free. According to copper and aluminum binary equilibrium phase diagram, the proper rolling temperature to be used in the isothermal rolling sub-unit 50 ranges from about 150° C. to about 550° C. By taking into account of the complex intermediate copper-aluminum compounds yielding on high annealing temperature and long period of annealing, the rolling temperature range can also be selected to be between about 150° C. and about 400° C. The annealing temperature is based on the rolling temperature and temperature changes due by heat generated by deformation to the room temperature. The annealing time is from about 30 seconds to about 20 minutes. It should be noted that the parameters provided above and/or discussed elsewhere in this specification are not intended as being exhaustive or limiting of the present invention. Those skilled in the art may change the parameters as may be best suited to the requirements of a particular use and still be within the scope of the present invention.

Figure 2:
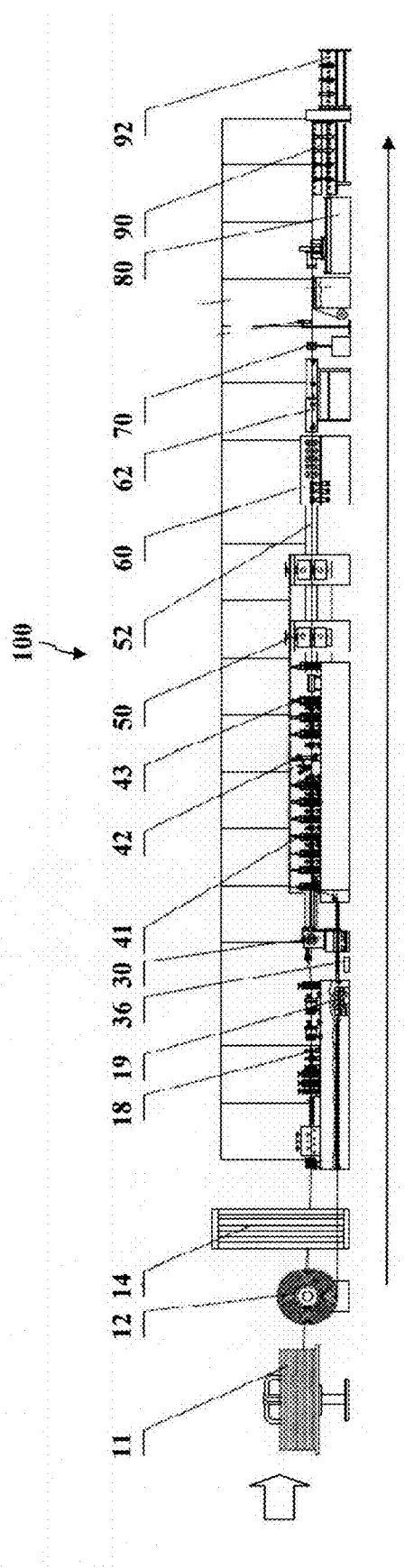
FIG. 2 is a schematic diagram illustrating the isothermal processing method of FIG. 1 and its system components shown in a side sectional view.

Referring to FIGS. 1 and 2, the present invention provides a system 100 for manufacturing the IPCCAC (isothermal processed copper cladded aluminum composite) 55. The system 100 includes the sub-unit 18 of the pretreatment unit 20 for cleaning the aluminum component 11 and for shape finishing the aluminum component 11 and the sub-unit 19 of the pretreatment unit 20 for cleaning the copper component 12. The system 100 may optionally include the copper stock 14 of the pretreatment unit 20. The system 100 further includes the extrusion unit 30 and its auxiliary hydraulic system 36 for extruding the aluminum component 11 into the core aluminum billet 35. The system 100 also includes the billet preparation assembly 40 having its sub-units discussed above (41, 42, 43) used to transform the cleaned copper component 25 and the core aluminum billet 35 into the copper cladded aluminum billet 45. Finally, the system 100 includes the isothermal rolling unit 50 and the annealing unit 52 for transforming the copper cladded aluminum billet 45 into the IPCCAC 55.

Referring to FIGS. 1 and 2, the system 100 may further optionally include a finishing modification unit 60, a protective coating unit 62, an inspection unit 70, a length cutting unit 80, a collecting and sorting unit 90, a finished products packaging unit 92. In one embodiment, most, if not all, of these optional units (62, 70, 80, 90, 92) have on-line capabilities allowing the system 100 to be ready for on-line production of IPCCAC 55 products. Referring to FIGS. 1 and 9, an optional inert-gas system 500 controls the gas pressure and flux involved in the method steps (106, 108, 109, 110) that are performed under an inert-gas environment by the unit 30, the billet preparation assembly 40 with its subunits 41, 42, 43, units 50 and 52. An additional optional temperature system 700 controls the temperature used in the method steps (106, 108, 109, 110) performed under specific temperatures by the units 30, 50, 52, 62 and sub-units 41, 42. An additional optional hydraulic system 800 controls the hydraulic pressure used in the method steps (106, 108, 109) performed under specific pressures by the units 30, 40, 50, 80 and sub-unit 36. An additional optional pneumatic system 900 controls the air pressure used in the method steps (106) performed under specific pressures by the units 30, 70, 80, 90, 92.

Referring to FIGS. 1, 2, and 9, the method 101 may optionally include one or more of the following steps: a step to modify finish of the IPCCAC 55 (111), a step to provide a protective coating to the IPCCAC 55 (112), a step to inspect the IPCCAC 55 (113), a step to cut the IPCCAC 55 into desired product length(s) (114), a step to sorting and collecting the qualified and disqualified IPCCAC 55 (115), and a step to packing the product(s) containing the IPCCAC 55 (116).

Referring to FIGS. 1 and 2 the finish modification step 111 is accomplished using the finishing modification unit 60. The step 111 may include utilizing online wet-polishing, reciprocating rinse, and compressed air-drying to finalize surface finishing. The mechanism of wet-polishing is constructed by sets of horizontal and vertical roller brushes. The brush line speed ranged from about 200 m/min to about 2000 m/min. The mechanical condition of the wet-polishing shall avoid or balance off either the formation of traction which will introduce tensile deformation. Otherwise, the formation of resistance will affect the system's operation. Axial vibration should be avoided. Otherwise, the straightness of the modified IPCCAC 65 may be affected. Referring to FIGS. 1, 2 and 9, after the finish modification step 111, the modified IPCCAC 65 undergoes the protective coating step 112 wherein the protective coating unit 62 is used to either electroplate tin or coat anti-oxidants onto the exterior surface of the modified IPCCAC 65. In one embodiment, the anti-oxidants coating ensures the life of the coating is more than one year under normal operating temperature and humidity condition for anti-oxidation.

After the protective coating step 112, the inspection unit 70 is used to accomplish the inspection step 113 wherein an online quality inspection of the modified IPCCAC 65 is performed. In one embodiment, the inspection unit 70 uses image recognition technology and eddy current testing to provide online inspection of production quality and detection of production defects. The inspection unit 70 may also use information communication technology to communicate with the length cutting unit 80 and the sorting and collecting unit 90.

Thereafter, the length cutting unit 80 is used to accomplish the composite cutting step 114 wherein the modified IPCCAC 65 is cut into desired product length(s In one embodiment, the length cutting unit 80 includes two sets of magnetic clutch and guided vertical roller tractor that are set at both feeding and discharging direction to prevent and cut off the disturbances of vibration generated by length cutting onto the inspection unit 70. The key to the cutting-to-length is automatic tracking, pneumatic clamping, procedure classification, and programmed motion element control. The length cutting unit 80 also includes high-speed saw and dual-synchronous belts. One belt provides power to the high-speed saw in back and forth movement for automatic tracking and pneumatic clamping. In one embodiment, the cutting-to-length ranges from about 2 m to about 6 m. The other belt provides power to the modified IPCCAC 65 for the movement along feeding direction. In one embodiment, the speed of the IPCCAC 65 is ranged from about 5 m/min to about 50 m/min; the high-speed saws generally have a cutting accuracy of about 2 mm/root. The programmed drive system and the motion element control the system memory for calculation, memory, instruction, and communication. The communication interface connects to host computer, the LED screen is equipped with human-machine digital interface.

After inspection and length cutting, the sorting and collecting step 115 is accomplished when the modified IPCCAC 65 (in desired product length) is identified by the sorting and collecting unit 90. The sorting and collecting unit 90 sorts out the modified IPCCAC 65 into two groups; the qualified and the unqualified. The qualified becomes an IPCCAC product 95 which is then passed to the packing unit 90 for packaging. The disqualified will go offline for waste and defective collection.

Finally, the packing step 116 is accomplished when the IPCCAC product 95 is packed by the packing unit 92.). The IPCCAC product 95 can be any of the IPCCAC 55 products discussed above. For example, the IPCCAC 65 can be used to produce bus-bars.

In one embodiment and referring to FIG. 1, an automation controller 600 is optionally included to control over entire production process including real-time control of isothermal, dynamic equilibrium, speed and deformation, atmospheric and hydraulic pressure, temperature, pneumatic devices and all variables control of each of the processing units. The controller is capable of communication with each of the units discussed above including the inert-gas system 500, the temperature system 700, the hydraulic system 800, and the pneumatic system 900.

It is understood that the present invention as described and claimed herein can be used for many additional purposes, therefore the invention is within the scope of other fields and uses and not so limited. The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. An isothermal processing method for making an copper clad aluminum composite comprising:
   a. providing an aluminum component and a copper component;
   b. cleaning the aluminum component and shape finishing the aluminum component;
   c. extruding the aluminum component into a core aluminum billet;
   d. cleaning the copper component;
   e. transforming the copper component into a copper cladding layer;
   f. cladding longitudinal and circumferential surface of the core aluminum billet with the copper cladding layer and molding the core aluminum billet and the copper cladding layer together to form a copper cladded aluminum billet;
   g. transforming the copper cladded aluminum billet into an isothermal processed copper cladded aluminum composite through isothermal rolling and annealing, wherein the isothermal rolling comprises rolling the copper cladded aluminum composite between a lower roller and an upper roller in the same temperature range as the copper cladded aluminum composite, wherein the isothermal processed copper cladded aluminum composite is comprised of: an aluminum core and a copper cladding wherein:
      (a) the copper cladding comprises a copper layer having a variance of thickness or depth of no more than 8%;
      (b) a boundary between the copper cladding and the aluminum core comprises a metallurgical bond; and
      (c) the metallurgical bond located at the boundary has a shear strength at the boundary greater than the anti-shear strength of aluminum.

2. The method of claim 1 further comprising at least one of the following processing steps selected from the group consisted of:
   a. modifying finish of the isothermal processed copper cladded aluminum composite;

b. applying a protective coating to the isothermal processed copper cladded aluminum composite;
c. inspecting the processed copper cladded aluminum composite to determine quality of the isothermal processed copper cladded aluminum composite;
d. cutting the isothermal processed copper cladded aluminum composite into desired product dimension;
e. sorting and collecting the isothermal processed copper cladded aluminum composite for packaging; and
f. a combination thereof.

3. The method of claim 1 wherein the cleaning and shape finishing the aluminum component step includes:
a. straightening the aluminum component;
b. rounding the aluminum component;
c. carving a rifle line onto the surface of the aluminum component; and
d. performing precise scraping and oxidation prevention upon the aluminum component such that uniformity of the aluminum reaches ±0.01 mm under an inert-gas which prevents a fresh surface of the aluminum component from secondary oxidation.

4. The method of claim 1 wherein the extruding the aluminum component into the core aluminum billet step includes forming a lumen within the core aluminum billet.

5. The method of claim 1 wherein the method is an on-line continuous process.

6. The method of claim 1 wherein step of cladding longitudinal and circumferential surface of the core aluminum billet with the copper cladding layer process and molding the core aluminum billet and the copper cladding layer together to form a copper cladded aluminum billet includes welding the copper cladding layer into tube-line structure around the core aluminum billet in an inert-gas atmosphere.

7. The method of claim 6 wherein the welding is performed using either a high frequency argon arc welding apparatus or a laser.

8. The method of claim 1 wherein the extruding the aluminum component into the core aluminum billet step is performed in an inert-gas atmosphere.

9. The method of claim 1 wherein the transforming the copper cladded aluminum billet into an isothermal processed copper cladded aluminum composite through isothermal rolling and annealing step is performed in an inert-gas atmosphere.

10. The method of claim 1 wherein the copper cladded aluminum billet is maintained in a predetermined temperature range of 150° C. to 400° C. during the isothermal rolling process.

* * * * *